K. R. LUNG ET AL 3,233,732

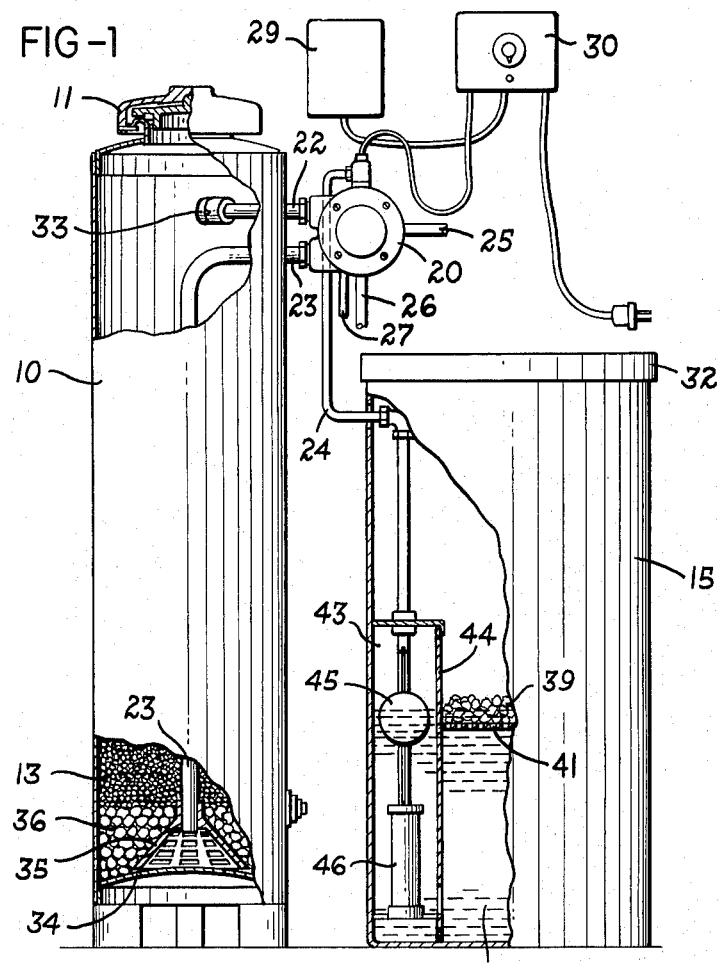
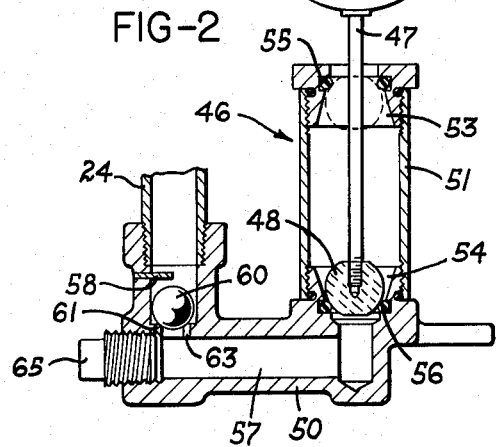

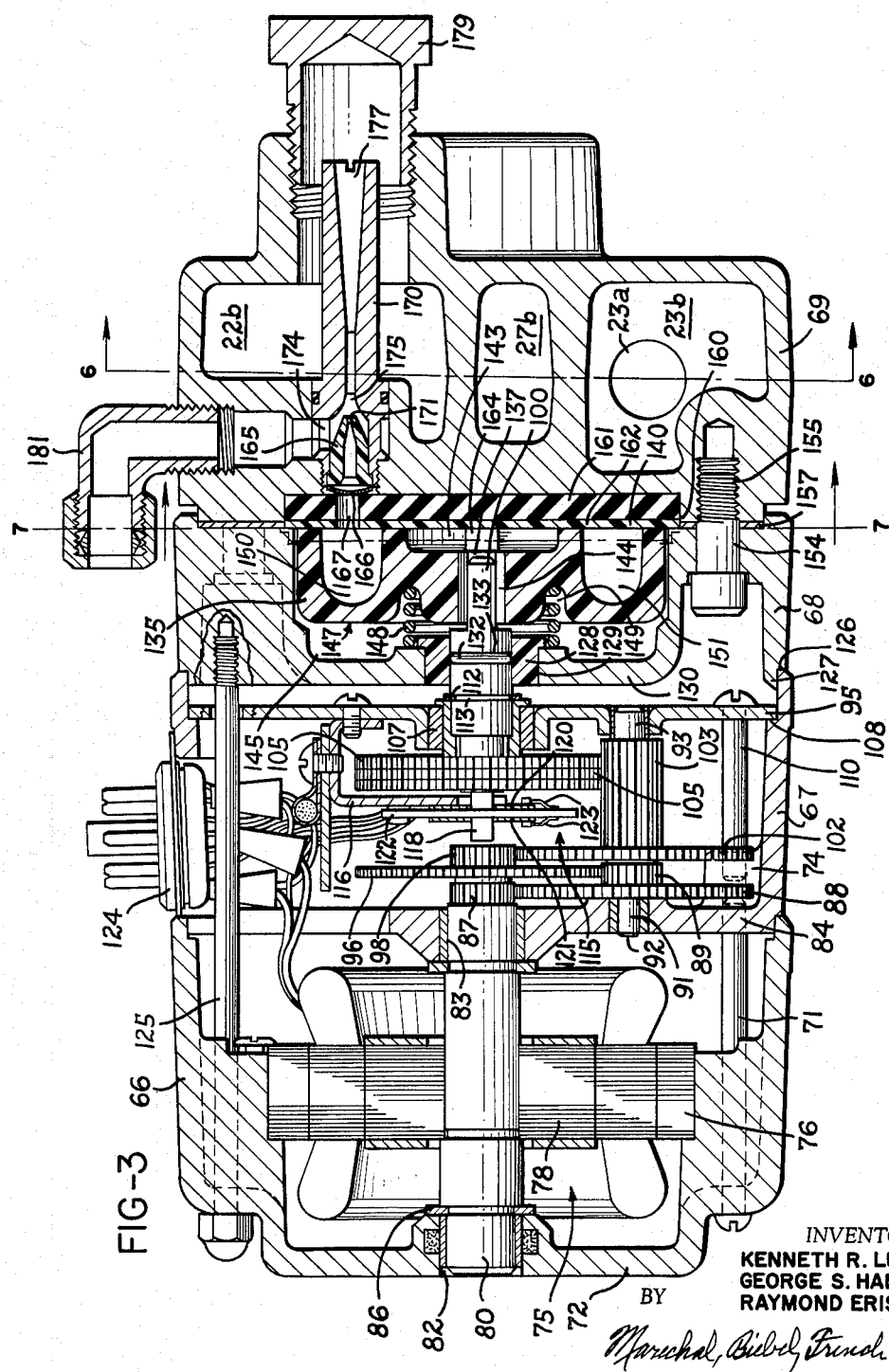

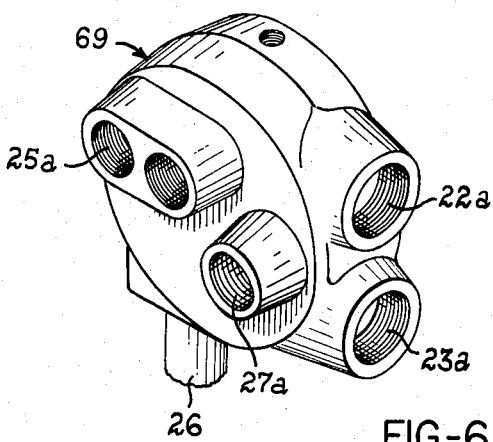
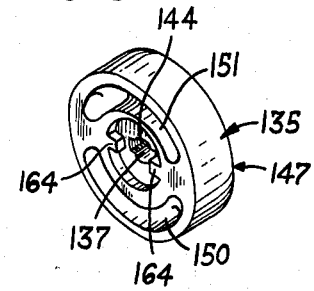
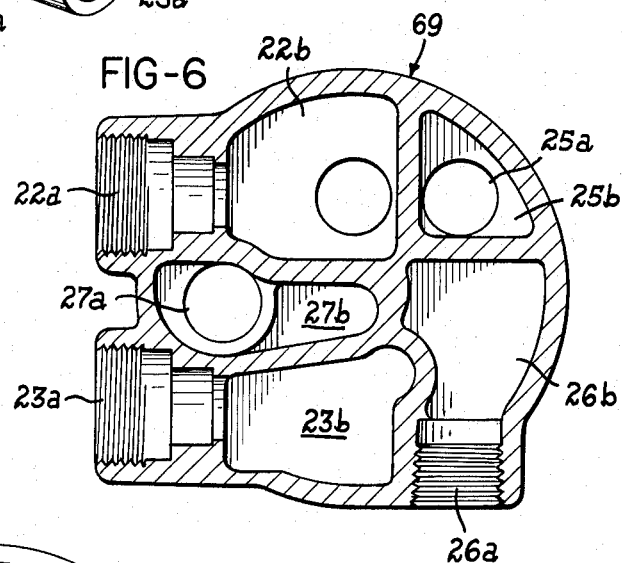
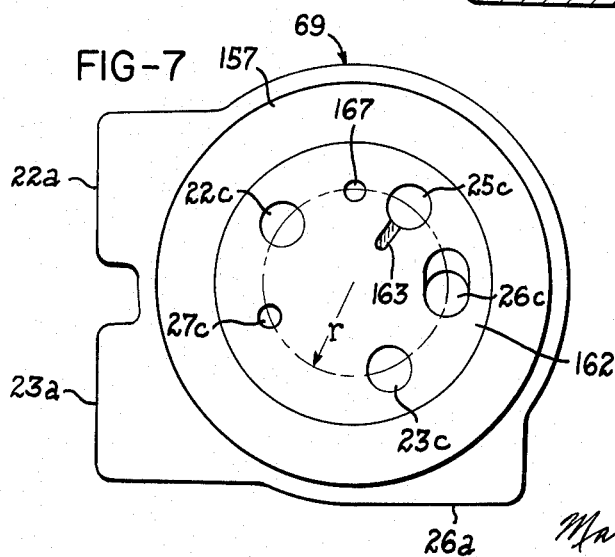
INVENTORS
KENNETH R. LUNG,
GEORGE S. HANSLEY &
RAYMOND ERISMAN, JR.
BY *Marechal, Biebel, French & Bugg*
ATTORNEYS Feb. 8, 1966     K. R. LUNG ET AL     3,233,732
WATER SOFTENING SYSTEM
Filed Feb. 28, 1962     6 Sheets-Sheet 4
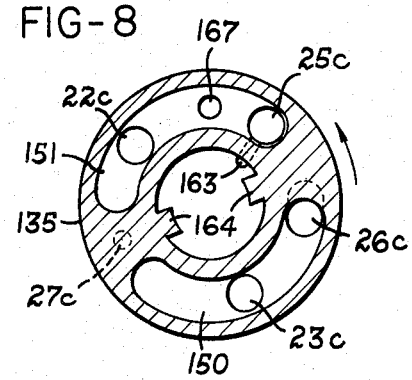
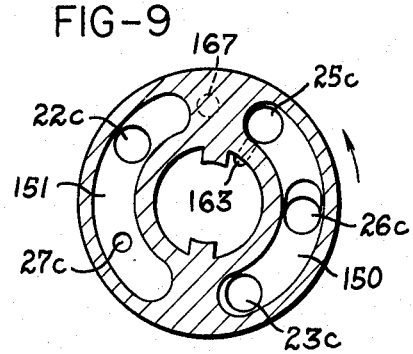
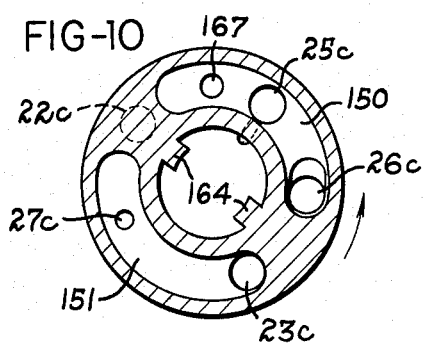
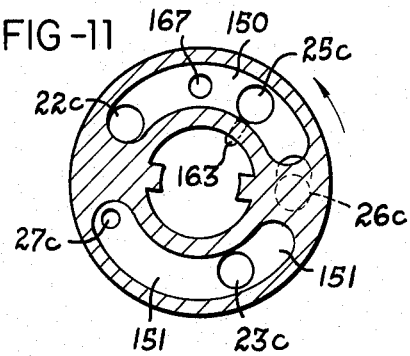
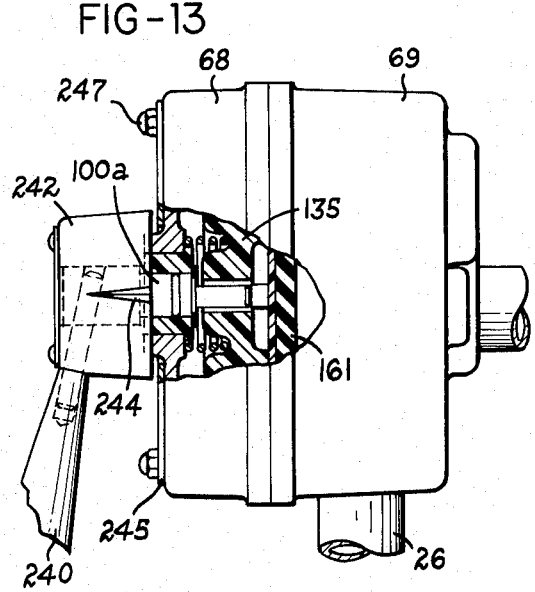
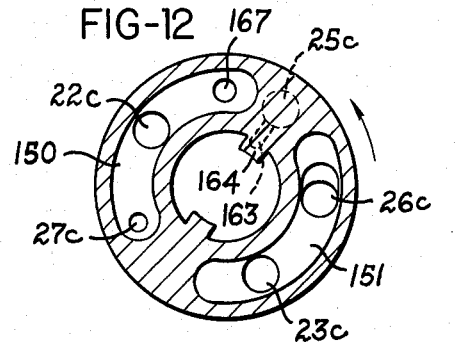
INVENTORS
KENNETH R. LUNG,
GEORGE S. HANSLEY &
BY   RAYMOND ERISMAN, JR.
ATTORNEYS Feb. 8, 1966

WATER SOFTENING SYSTEM

Filed Feb. 28, 1962

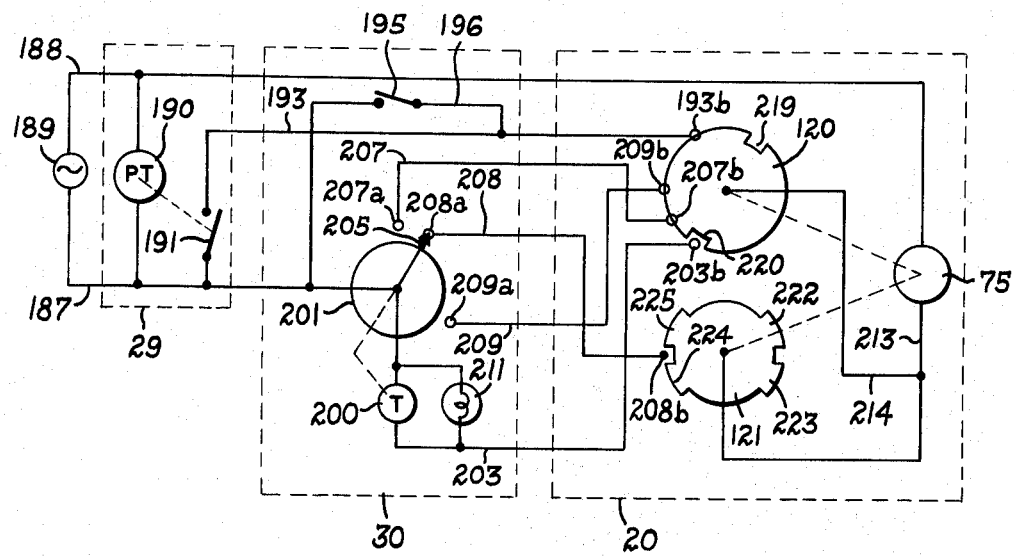

FIG-15

| FULLY AUTOMATIC SYSTEM | | | | | | | | |
|---|---|---|---|---|---|---|---|---|
| VALVE ROTOR POSITION | 191 | 195 | 205 | 219 220 | 222 224 | 223 225 | TIMER 200 | MOTOR 75 |
| SOFTENING | OPEN | OPEN | 208a | 203b | OPEN | OPEN | OFF | OFF |
| START BACKWASH | CLOSE | CLOSE | 208a | 203b | " | " | OFF | ON |
| TO BACKWASH | OPEN | OPEN | 208a | TO 193b | " | 208b | OFF | ON |
| BACKWASH | " | " | 208a | 193b | " | " | ON | OFF |
| START BRINE SLOW RINSE | " | " | 209a | 193b | " | " | OFF | ON |
| BRINE SLOW RINSE | " | " | 209a | 209b | " | " | ON | OFF |
| START FAST RINSE | " | " | 207a | 209b | " | " | OFF | ON |
| FAST RINSE | " | " | 207a | 207b | 208b | " | ON | OFF |
| START SOFTENING | " | " | 208a | 207b | 208b | " | OFF | ON |
| SOFTENING | " | " | 208a | 203b | OPEN | " | OFF | OFF |

INVENTORS
KENNETH R. LUNG,
GEORGE S. HANSLEY &
RAYMOND ERISMAN, JR.
BY

ATTORNEYS

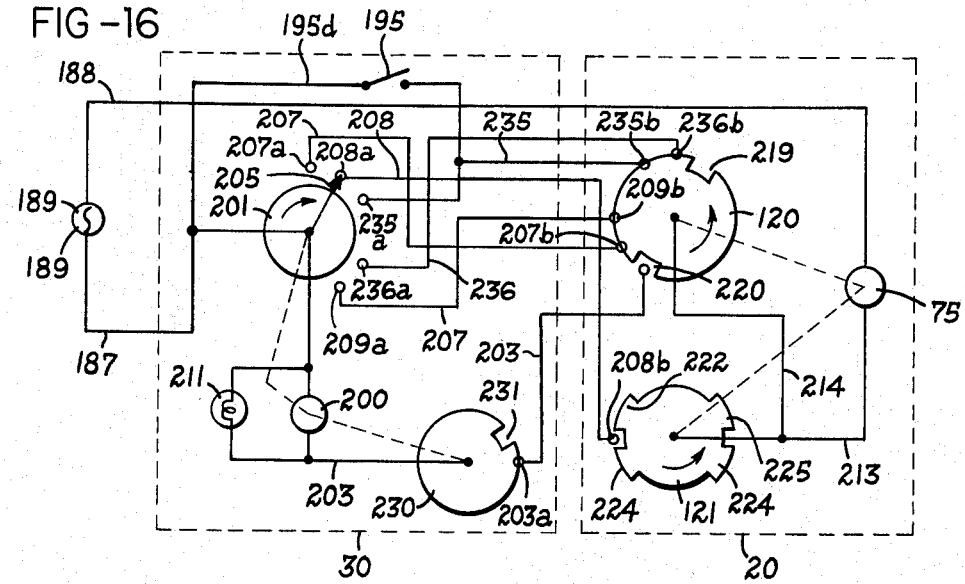

| SEMI-AUTOMATIC SYSTEM | | | | | | | |
|---|---|---|---|---|---|---|---|
| VALVE ROTOR POSITION | 205 | 231 | 219 220 | 222 224 | 223 225 | TIMER 200 | MOTOR 75 |
| SOFTENING | 208a | CLOSED | 203b | OPEN | OPEN | OFF | OFF |
| START BACKWASH | 208a 235a | " | 203b | 208b | " | OFF | ON |
| TO BACKWASH | " | " | TO 235b | " | 208b | OFF | ON |
| BACKWASH | " | " | 235b | " | OPEN | ON | OFF |
| START OFF | 236a | 203a | " | " | " | " | ON |
| OFF | " | " | 236b | " | " | " | OFF |
| START BRINE SLOW RINSE | 209a | CLOSED | " | " | " | " | ON |
| BRINE SLOW RINSE | " | " | 209b | " | " | " | " |
| START FAST RINSE | 207a | " | " | " | " | OFF | " |
| FAST RINSE | " | " | 207b | 208b | " | ON | OFF |
| START SOFTENING | 208a | " | " | " | " | OFF | ON |

INVENTORS
KENNETH R. LUNG,
BY GEORGE S. HANSLEY &
RAYMOND ERISMAN, JR.

ATTORNEYS

United States Patent Office 3,233,732
Patented Feb. 8, 1966

3,233,732
WATER SOFTENING SYSTEM
Kenneth R. Lung, George S. Hansley, and Raymond Erisman, Jr., Dayton, Ohio, assignors to The Tait Manufacturing Company, Dayton, Ohio, a corporation of Ohio
Filed Feb. 28, 1962, Ser. No. 176,209
5 Claims. (Cl. 210—138)

This invention relates to a water conditioning system and particularly to a domestic system for automatically softening water.

Water softeners have found extensive use in the average home wherein it is necessary to eliminate certain minerals from the water so that soft water is provided for drinking, cooking, personal and laundry use. The present practice is to provide a main tank filled with a softening reagent and a second tank having brine therein which is utilized in regenerating the softening reagent. In normal use the hard water is allowed to flow through the softening reagent and then is made available to the water system in the house in its softened condition. Since the ionic exchange between the hard water and the reagent soon greatly decreases the effectiveness of this reagent, it is necessary to provide a regeneration process for revitalizing this softening compound. This usually consists of first backwashing the reagent by forcing water upwardly therethrough for the purpose of loosening the softening material and flushing away trapped articles of iron and other impurities.

Subsequent to the backwashing the softening material is regenerated by drawing the salt brine from the brine tank into the main tank and allowing it to filter down through the softening material thus restoring in a well known manner the effectiveness of the softening material. Next the brine solution must be completely rinsed from the softening reagent so that none of the salt remains in the system to contaminate the water during the normal use thereof, consequently a rinse cycle is provided during which hard water is allowed to flow through the main tank and into the drain.

It is desirable to provide automatic controls for the water softening system of this type so that the flow of hard and soft water, as well as the brine solution, is regulated in a reliable but simple manner without requiring complex valve arrangement and the like since such arrangements are susceptible to partial and complete breakdown when used for extended periods of time.

An important object of this invention is to provide an improved water softening system of the aforesaid character having a minimum number of moving parts, and which operates with increased efficiency and reliability.

Another object of this invention is to provide a control valve which has only one moving part but which is capable of simultaneously controlling fluid flow through and between a relatively large number of ports and their associated pipes or conduits.

Another object of this invention is to provide a water softening system for domestic use which has a control valve having essentially only one moving part which controls and regulates all fluid flow in the water softening system, and particularly to provide a valve of this type having an improved seal arrangement for obviating fluid leakage between the valve elements without requiring use of the well known conventional seals which tend to wear out and fail after extended periods of use.

A further object of this invention is to provide a control valve for an improved water softening system which can be easily adapted for manual, semi-automatic or top loading, or fully automatic operation and which permits continued use of the various water outlets in the home in which the system is located during regeneration of the softening reagent.

A further object of this invention is to provide a water softening system having a brine tank associated therewith, and particularly to provide a brine valve cooperating with the brine tank for permitting only a predetermined volume of brine to be withdrawn from the tank during each regeneration cycle and which also regulates the rate of flow of water into the tank and terminates this flow when a predetermined maximum water level is attained.

Another object of the present invention is to provide a control valve for a water softening system of the aforesaid type with electrical controls for automatically initiating the regeneration cycle at predetermined timed intervals and for sequentially positioning the control valve to effect the regeneration of the softening reagent, including backwash, brining, and rinsing or flushing operations.

A still further object of this invention is to provide a single tank or top-loading type of water softening system with an automatic electrical control system for positioning a control valve to effect the backwash operation and then subsequently moving the valve to the off position wherein water is syphoned from the main tank into the drain so that salt can be added without the danger of the main tank overflowing.

Other objects and advantages of the invention will be apparent from the following description, the accompanying drawings and the appended claims.

In the drawings—

FIG. 1 is an elevation view of a water softening system embodying the present invention;

FIG. 2 is an elevation view partially in section of the brine valve;

FIG. 3 is a transverse sectional view through the control valve;

FIG. 4 is a perspective illustration of one side of the valve body showing the connections thereto;

FIG. 5 is a perspective view illustrating the valve rotor;

FIG. 6 is a sectional view essentially along the line 6—6 of FIG. 3 illustrating the various chambers formed in the valve body;

FIG. 7 is a view illustrating the valve plate and the arrangement of the ports thereon;

FIGS. 8–12 are schematic views looking essentially along the line 8—8 of FIG. 3 and showing the various relative positions of the ports and the valve rotor which occur during the operation of the water softening system;

FIG. 13 is an elevation view partially broken away and illustrating manual apparatus for positioning the valve rotor;

FIG. 14 is an electrical schematic of the control system utilized for a completely automatic water softening system;

FIG. 15 is a table illustrating the operation of the control system shown in FIG. 14;

FIG. 16 is another electrical schematic showing the control system which is used with the semi-automatic or top-loading water softening system; and FIG. 17 is a table similar to that shown in FIG. 15 but illustrating the operation of the electrical circuitry of FIG. 16.

Referring to the drawings which illustrate preferred embodiments of the invention, FIG. 1 shows an entire water softening system including a main softening tank 10 partially filled with a water softening reagent, such as polystyrene resin, and having a manually removable pressure cap or cover 11. A brine tank 15 is disposed next to the main tank 10 and supplies a salt water or brine solution 16 for regenerating the water softening reagent 13 in a conventional well known manner.

A control valve 20 is the nerve center of the softening system and is connected to the top and bottom of the softening tank by the pipes or conduits 22 and 23, respectively. The valve 20 is also connected to the brine tank 15 by suction pipe 24, to a hard water inlet pipe 25 connected to a source of hard water, to a soft water outlet pipe 26 connected to the water system of a home or similar structure, and to a drain 27. The valve 20 is actuated by a program timer 29 which periodically, usually once or twice a week, actuates the automatic controller 30 which then effects movement of the control valve 20 through the various positions necessary to complete the regeneration cycle as will be described.

The pipe 22 connected to the top of the tank 10 has a regulator valve 33 on one end thereof of the type shown and described in the United States Letters Patent of George S. Hansley, No. 3,066,696, issued December 4, 1962, and assigned to the assignee of the present application. The valve 33 allows substantially unrestricted outward flow from the pipe 22 while permitting only a predetermined restricted flow in the opposite direction from the tank into the pipe 22. As explained in the aforesaid application, the restricted flow through the valve 33 is substantially uneffected by pressure variation of the fluid moving therethrough.

The pipe 23 extends vertically through the tank and communicates with the bottom thereof just short of the tank bottom 34 and has a cone shaped perforated strainer 35 and the associated filter material 36 or the like mounted around the lower end thereof to insure proper flow through the pipe 23 by preventing clogging, as well as providing for even distribution of fluid flowing from the pipe 22.

The brine tank 15 has a cover 32 thereon which is removable for filling with salt at periodic intervals, usually once or twice a year, depending on the hardness of the water and the frequency of regeneration. The salt 39 is supported in the tank 15 a few inches below the maximum water level, as shown in FIG. 1, by the perforated plate 41 thus allowing the water to dissolve the salt and produce brine for use in regenerating the softening reagent in the main tank 10. The plate 41 is preferably constructed of a non-corrosive plastic material which is not adversely affected by long and continuous contact with salt and brine. An enclosed brine well 43 is defined by the side of the tank 15 and the separating member or partition 44 thereby providing an unrestricted operating space for movement of a float 45, as well as for protecting the brine valve 46 from clogging by salt crystals and other foreign matter.

As shown in FIG. 2, the brine valve 46 is connected to and controls flow through suction pipe 24 and is actuated by the float 45 acting through connecting rod 47 to vertically position the ball 48 in response to the brine level in the tank 15. The valve body or housing 50 includes an elongated sleeve 51 having valve guides 53 and 54 mounted a predetermined distance apart near the opposite ends thereof and having valve seats 55 and 56, respectively, so that flow from the pipe 24 into the tank 15 is blocked when the ball 48 is positioned against its uppermost seat 55, as shown by broken lines in FIG. 2, and flow from the brine tank 15 into the pipe 24 is blocked when the ball 48 is positioned against its lowermost seat 56, as shown in solid lines in FIG. 2. The seats 55 and 56 are suitably mounted in each of the valve guides 53 and 54 to insure complete blocking of flow when the ball is seated thereagainst.

A ball check valve is also provided in the valve housing 50 for permitting substantially unrestricted flow from the passage 57 to the pipe 24 while restricting flow in the opposite direction. A suitable projection 58 limits the upward movement of the ball 60 so that when fluid flows into the pipe 24 from the tank 15, the ball 60 is forced upwardly and does not materially reduce the rate of flow. However, when flow through this pipe 24 is reversed, the ball 60 is forced against its seat 61 and only limited flow is permitted through the notch or groove 63 cut in the valve seat 61. For the purpose of facilitating manufacture and periodic cleaning of the valve 46, access can be gained to the passage 57 by removing the plug 65 which threadedly engages the valve housing 50 as shown.

The control valve assembly is shown in detail in FIG. 3 and includes four sections connected in sandwiched relation, namely, motor, gear, and valve rotor housings 66, 67, and 68, respectively, and a valve body 69 which has the various fluid pipes 22 through 27 connected thereto. The motor housing 66 is fastened securely to the gear housing 67 by a plurality of screws 71 each of which extends through the end 72 of the housing 66 and is threadedly received in a boss 74. An electric motor 75 is positioned in housing 66 and includes a stator 76 which is rigidly secured in the housing 66 and cooperates with a rotor 78 for effecting rotation of the drive shaft 80 in a well known manner. The drive shaft 80 and hence the rotor 78 are suitably supported and journaled in the bores 82 and 83 formed in the ends 72 and 84, respectively, of the housings 66 and 67. The thrust washers 86 are positioned on the drive shaft 80 for the purpose of limiting axial movement of the shaft by their engagement with the end walls 72 and 84.

The gear housing 67 encloses a gear train provided for reducing the speed of the motor 75 and including a small drive pinion 87 rigidly secured to the motor shaft 80. The pinion 87 drives a larger gear 88 and the pinion 89 which is connected thereto, both of which are mounted for rotation on the shaft 91 having one end 92 suitably journaled in the end 84 of housing 67 and the opposite end 93 similarly secured in the end plate 95. The pinion 89 drives a larger gear 96 and its rigidly interconnected pinion 98 both of which freely rotate on the end of the shaft 80. The rotor shaft 100 is then rotated by the pinion 98 acting through the gear 102, its connected pinion 103 and the main drive gear 105 which is rigidly connected to the rotor shaft 100.

The rotor shaft 100 is supported by and rotatably journaled in the bearing 107 mounted in the end plate 95 which is in turn secured to the housing 67 against the shoulder 108 by a number of screws 110 (only one is shown) which are spaced around the outer periphery of the plate 95 and extend into threaded engagement with a boss 74. Axial movement of the shaft 100 to the left, as viewed in FIG. 2, is prevented by the snap ring 112 which engages the groove 113 in the shaft 100, while movement in the opposite direction is blocked by the gear 105.

A switch assembly 115 is supported by the bracket 116 in the gear housing 67 and is driven by the extension 118 of the rotor shaft 100. The assembly 115 includes two rotary switches 120 and 121 which are mechanically connected and electrically separated and are rotated by extension 118 and arranged one on either side of the mounting plate 122 having a plurality of spring biased contacts 123 mounted thereon, which cooperate with the rotary switches 120 and 121 to make and break electrical circuits, as will be explained in detail. Since the rotary switches 120 and 121 are connected to the extension 118 they are directly responsive to the position of the rotor shaft 100. A suitable female connection 124 is provided so that appropriate electrical conductors can be connected to the motor 75 and the switch assembly 115.

The motor and gear housings 66 and 67 are secured by through-bolts 125 to the valve rotor housing 68 against the shoulder 126 formed around the outer periphery of the end 127 of the housing 68. When properly mounted the rotor shaft 100 extends through the bearing 128 mounted in the bore 129 formed in end wall 130 of the housing 68. An annular seal ring 132 is positioned in a groove 133 formed in the shaft 100 for preventing fluid leakage between the shaft 100 and the associated bearing 128.

The valve rotor 135 is driven by the shaft 100 which has opposite sides of one end relieved or flattened for engagement with the slot 137 (see FIG. 5) in the rotor 135. This structure allows the shaft 100 to rotate the rotor 135 while permitting axial movement therebetween so that the rotor 135 can be urged into substantially fluid tight contact with the valve plate 140.

A chamber 143 which is formed by the rotor 135 and the valve plate 140 communicates through grooves 144 (see FIGS. 3 and 5) along the slot 137 with the chamber 145 defined between the end wall 130 of the housing 68 and the rotor 135 so that water pressure may act on the rear side 147 of the rotor 135 to urge it against the valve plate 140. A spring 148 surrounds the shaft 100 and is interposed between the end wall 130 and the groove 149 formed in the rotor 135 for the purpose of exerting additional pressure on the rotor 135 toward the plate 140.

As shown best in FIGS. 3 and 5, the rotor has two symmetrical arcuate channels or grooves 150 and 151 formed therein for the purpose of interconnecting certain of the ports on the valve plate 140, as will be explained in detail in connection with the valve operation. The rotor 135 is preferably constructed from a corrosion resistant material, such as phenolic resin or the like, but it is within the scope of the invention to use any of the known materials, as long as the functional requirements of the rotor as described herein are substantially maintained.

Referring again to FIG. 3, the rotor housing 68 has the valve body 69 bolted thereto by a number of screws 154 which extend into threaded engagement with the appropriately threaded bores 155 in the valve body 69, and a gasket 157 is interposed between these housings to seal against fluid leakage therebetween. The valve plate 140 is positioned in the relieved portion 160 of the housing 69 and includes a resilient backup member 161, preferably of rubber, with a wear resistant, self-lubricating, non-corrosive face plate 162, preferably of polytetrafluoroethylene or "Teflon," bonded thereto for sealing engagement with the valve rotor 135.

As shown in FIG. 7, a number of ports 22c through 28c are formed in the valve plate 140 with their centers on a circle having a radius r, and these ports connect to chambers formed in the valve body 69 and then to the various pipes which connect to the valve body. Specifically, referring to FIGS. 3, 4, 6 and 7, it is seen that the hard water inlet pipe 25 communicates through connections 25a with the chamber 25b formed in the valve body 69, which then communicates with the hard water inlet port 25c in the valve plate 140. This port 25c is provided, as shown best in FIG. 7, with a cut-out portion 163 so that the hard water inlet is continually in communication with the chamber 143 formed between the valve rotor 135 and the valve plate 140. Since the chamber 143 communicates through the grooves 144 with the chamber 145 behind the rotor 135, the inlet water pressure constantly urges the rotor 135 into sealing engagement with the valve plate 140 except when the cut-out portion 163 is blocked by either of the extensions 164 when the rotor 135 is in the off position as will be described.

Similarly, the pipes 22 and 23 which connect to the top and bottom of the main tank 10 communicate through the connections 22a and 23a formed in the valve body 69 to the chambers 22b and 23b and then the top and bottom tank ports 22a and 23c in the valve plate 140, respectively. The chamber 22b (see FIG. 3) also has mounted therein an ejector pump including the nozzle 165 which communicates through the filter screen 166 with the ejector port 167 in the valve plate 140, and the venturi member 170 which is mounted immediately downstream of the nozzle outlet 171. The suction chamber 174 of the jet pump is formed around the nozzle outlet 171 and venturi inlet 175 and is in communication with the suction pipe 24 of the brine tank 15. The venturi outlet 177 is connected to the chamber 22b so that when high pressure fluid is forced through the nozzle 165 into the venturi member 170, a suction will be created in the chamber 174 for drawing the brine through pipe 24 and into the chamber 22b and into the pipe 22.

The venturi member 170 and its associated nozzle 165 can be easily removed from the valve body 69 by merely removing the cap 179 and unscrewing the member 170 and then withdrawing both these components from the valve body 69. This allows adaptation of the control valve 20 to a single tank system wherein the brine tank 15 is not used and consequently the jet pump is not required. In this arrangement a plug having an opening therethrough is screwed into the threads vacated by the venturi member 170. The opening in this plug is of a size to allow a rate of flow therethrough which is equal to the flow through the nozzle 165 so that the brine-slow rinse operation is not altered in any manner. The elbow 181 is also removed and replaced with a suitable plug.

The soft water outlet pipe 26 is in communication through the connection 26a with the chamber 26b in valve body 69 which also communicates with the outlet port 26c in the valve plate 140. As shown in FIG. 7, the outlet port 26c is somewhat elongated as compared to the other ports for reasons to be explained in detail in connection with the operation of the valve 20. Similarly, the drain pipe 27 communicates through connection 27a to the chamber 27b having the drain port 27c in constant communication therewith.

The operation of the control valve 20 is best explained in connection with FIGS. 8 through 12 wherein the cooperation between the ports in the valve plate 140 and the channels 150 and 151 in the valve rotor 135 is shown somewhat schematically. In the softening position, as shown in FIG. 8, the valve 20 operates the system in the normal softening cycle wherein hard water is forced through the main tank 15 where it is softened and then returned through the valve to the soft water outlet. Specifically, the hard water inlet port 25c communicates through channel 151 with the port 22c so that the hard water flows through chamber 22b, pipe 22, and the regulator valve 33 to the top of the main tank 10. Also, in this position the softened water flows from the bottom of the tank 10 through pipe 23, port 23c, channel 150, and the soft water outlet port 26c, through chamber 26b and pipe 26 to the water outlets of the home in which the system is located.

In this position the inlet port 25c also communicates with the ejector port 167 of the jet pump but since the nozzle 165 of the jet pump is relatively small in diameter, the water merely by-passes the pump through port 22c to the chamber 22b. In this position water may flow into the brine tank 15 until the float 45 has positioned the ball valve 48 in its uppermost position against the upper seat 55 so that further water flow into the brine tank 15 is blocked.

To regenerate the softening reagent in the main tank 10, the valve rotor 135 is rotated in a counterclockwise direction to the backwash position, shown in FIG. 9, wherein the hard water inlet 25c now communicates with both the soft water outlet 26c and the tank bottom port 23c through channel 150. Thus the hard water flows into the chamber 23b, through the line 23 and into the bottom of the tank 15, and then upwardly through the softening reagent and into the regulator valve 33 at a controlled maximum rate. From the valve 33 the water flows into the pipe 22, chamber 22b, and top port 22c in the valve plate 140, through the channel 151 in the valve rotor 135 and into the drain port 27c from which it passes into the drain system. As mentioned, the hard water inlet 25c also is in communication with the soft water outlet 26c so that the hard water can be drawn through the various outlets for use in the home in which the system is mounted thereby permitting use of water during regeneration.

After completion of the backwash cycle, the valve is rotated to the brine-slow rinse position, shown in FIG. 10, wherein the port 22c is blocked and the hard water inlet port 25c communicates through channel 150 with the ejector port 167 to force pressurized water through the nozzle 165 and into the venturi inlet 175 thereby creating suction in the chamber 174 surrounding venturi inlet 175 which draws the brine from the tank 15 through the pipe 24 and into the top chamber 22b, from which it flows into the top of the main tank 10 through the pipe 22 and valve 33 and thereafter circulates down through the softening reagent to revitalize it in the conventional manner.

At the start of the brine cycle, the level of brine in the tank 15 is at its maximum and the ball valve 48 is positioned against its uppermost seat 55 by the float 45. When suction is created in the chamber 174, it draws the water from the pipe 24 causing the check valve 60 to be moved to its full open position and the ball valve 48 to be drawn downwardly thus permitting the brine to flow to the top of the main tank. This operation continues until the level of the brine decreases to the point where the float 45 positions the ball valve 48 against the lower valve seat 56 thereby blocking further flow of brine to the control valve 20. When this occurs the brine cycle has been terminated and the slow-rinse cycle begins since the hard water continues to flow through the nozzle 165 into the top chamber 22b and then into the top of the tank 10 to rinse the salt solution from the softening reagent. During both the brine and slow-rinse cycles the bottom of the tank is connected through pipe 23, chamber 23b, port 23c, and channel 151, to the drain port 27c so that the expended brine and the rinse water are discharged. In this position the hard water inlet 25c is also connected to the soft water outlet 26c so that water pressure is available to other outlets in the water system.

On completion of the slow rinse cycle, the valve rotor 135 is again rotated in a counterclockwise direction to the fast rinse position, shown in FIG. 11, wherein the hard water inlet pipe 25 is connected to the top of the tank 10 through port 25c, channel 150, port 22c, and pipe 22 so that the full water pressure is allowed to flow into the tank 15 for the fast rinsing action. In this position the soft water outlet port 26c communicates in a restricted manner with the elongated portion of the inlet port 25c so that some water is still available to the water outlets in the system. Also in this position the bottom of the tank 10 communicates with the drainage system in the same manner as it did in the brine-slow rinse cycles since the rotor 135 has not been moved sufficiently to disconnect ports 23c and 27c. The size of port 27c is comparatively small for the purpose of producing a back pressure so that some pressure always remains in the associated water system.

If the system is of the semi-automatic or single tank type wherein the brine tank 15 is not used and the salt is added manually during the brining operation after removing the cover on the main tank, it is necessary to block the hard water inlet port 25c during the time that the top cover is removed. Consequently, as shown in FIG. 12, an off position is provided wherein the inlet port 25c is completely blocked and the system is then completely inoperative so that the cover 11 can be removed from the tank 10 without causing the water to overflow. When the top loading arrangement is used the off position is used between the backwash and slow-rinse cycles, as will be explained.

In the off position the port 23c is connected to the drain port 27c so that a syphoning action is set up by the water which is in the pipe 23, and at least a portion of the water is drained from the tank 10 thereby allowing the salt to be added without causing overflow. The pipe 23 will always be filled with water when the rotor 135 reaches the off position since water was flowing therethrough when the backwash operation was automatically terminated and the rotor 135 moved to the off position.

Since in the off position the inlet water pressure is not connected to either of the channels 150 or 151, the sealing pressure between the rotor 135 and the plate 140 is substantially increased because the water pressure acting in the channels 150 and 151 is not present to counteract to a certain extent the sealing forces applied to the rear side of the rotor 135, thus making it difficult, and perhaps impossible, for the motor 75 to initiate additional movement of the rotor 135. Hence the projections 164 are provided on the valve rotor 135 for blocking the cut-out portion 163 and cutting off the supply of inlet water to the chamber 145 behind the rotor 135 when the rotor 135 is in the off position.

The rotor 135 is positioned automatically in each of the aforesaid positions by a fully automatic control system shown in FIG. 14 which includes the electrical conductors 187 and 188 connected to a suitable source 189 of electrical current. A program timer 29 includes a timer mechanism 190 electrically connected to the conductors 187 and 188 and mechanically connected to the switch 191 for momentarily closing it to complete a circuit from conductor 187 through the conductor 193 to the contact 193b. The timer 190 is actuated at preselected intervals which are manually set thereon for the purpose of initiating the regeneration cycle by starting operation of the control system. The interval depends on the particular requirements of the softening system and is usually once or more a week. The circuit between conductor 187 and contact 193b can also be completed by closing the manually actuated normally open switch 195 in the conductor 196 mounted on the control box 30.

The electrical timer 200 is electrically connected with the conductor 187 and is mechanically connected to the rotary switch 201 and also electrically connected to the contact 203b by the conductor 203. When operating, the timer 200 will rotate the switch 201 so that the contact 205 thereon sweeps across the contacts 207a, 208a and 209a connected through the conductors 207, 208 and 209 to the contacts 207b, 208b and 209b, respectively. A light bulb 211 may be placed in parallel with the timer 200 for giving visual indication of the timer operation.

The control valve 20 houses the motor 75 which has one terminal connected to the conductor 188 and the other to conductor 213 which connects electrically to the rotary switch 120 through the conductor 214. As shown in FIG. 3 the rotor switches 120 and 121 are connected directly to the rotor shaft 100 and consequently turn with this shaft and are always correlated to the valve rotor 135 position.

The switch 120 is normally in engagement with the contacts 193b, 203b, 207b and 209b, except when cut-out portions 219 and 220 on the opposite sides of the switch 120 are positioned adjacent one of these contacts to disconnect it electrically from the switch 120. The rotary switch 121 has four projections 222, 223, 224 and 225 thereon, each of which will complete a circuit between the conductors 213 and 208. Since the switches 120 and 121 turn with the valve rotor 135 which moves through 180° during each regeneration cycle, the switches 120 and 121 are constructed symmetrically so that the switches will effect operation of two identical regeneration cycles when rotated through one complete revolution.

Operation of the fully automatic control system is best explained by referring to the table shown in FIG.

15, as well as the circuit shown in FIG. 14. When the water softening system is operating in its normal or softening position, that is, when the valve rotor 135 is in the position shown in FIG. 8, the control circuit is substantially inoperative with the exception of the program timer 190 which continues to run since its purpose is to initiate the regenerating cycle at periodic intervals. Thus as shown in FIGS. 14 and 15 the switches 191 and 195 are open, the contact 205 of the switch 201 is in engagement with the contact 208a, and the cut-out portion 220 of switch 120 is positioned above the contact 203b so that the circuit to the timer 200 is open and the timer inoperative. The switch 121 is also positioned so that none of its projections 222–225 engage the contact 208b so the lines 208 and 213 are open and the motor 75 inoperative.

To start the regeneration cycle and thus move the valve rotor 135 to the backwash position, the switch 195 is closed manually or switch 191 is closed by the timer 190, thereby completing a circuit to the motor 75 through the conductor 187, conductor 193 or 196, the contact 193b and switch 120 which is always connected to the motor 75 via conductors 214 and 213. Since the switches 191 or 195 are closed only momentarily, initial movement of the motor 75 rotates the switch 121 in a counterclockwise direction so that projection 225 sweeps across the contact 208b completing a circuit to the motor through switch 201, conductor 208 and switch 121. When the valve rotor 135 reaches the backwash position, further rotation thereof is stopped automatically since the contact 225 has been rotated sufficiently so that it no longer engages the contact 208b, consequently the circuit to the motor 75 is opened.

During the rotation of the valve rotor to the backwash position, the switch 120 is also being rotated to a position wherein the cut-out portion 219 is aligned with the contact 193b so that, if switch 191 or 195 is held in a closed position, the circuit therethrough to the motor 75 will nevertheless be opened so that the backwash operation is controlled solely by switch 121. Also, in the backwash position the contact 203b is in engagement with the switch 120 so that the timer 200 is energized by completion of a circuit through the conductor 203, the switch 120, and the conductors 214 and 213.

The timer 200, however, does not rotate the switch 201 so that projection 205 engages contact 209a until sufficient time has elapsed so that the backwash operation is completed. Then to start the brine and slow-rinse operations, the timer 200 moves the switch 201 so that the contact 205 engages the contact 209a and a circuit is again completed to the motor 75 through the line 209, the switch 120, and the conductors 214 and 213. In this position the timer operation is terminated by reason of the short circuit created through the conductors 209, switch 120, and the conductor 203. As the motor 75 turns the switch 120, the cut-out portion 219 moves to a position aligned the contact 209b wherein the circuit to the motor 75 is again opened and the circuit to the timer 200 is again completed.

Here again the timer 200 does not rotate the switch 201 sufficiently for the projection 205 to engage the contact 207a until sufficient time has elapsed for completion of the brine and slow-rinse cycles. To start movement of the valve rotor 135 to a fast rinse position, the timer 200 moves the switch 201 sufficiently so that the projection 205 engages the contact 207a thereby again completing a circuit to the motor 75 through the line 207 and the switch 120. As the rotor 135 reaches the fast-rinse position, the switch 120 is moved to a position wherein the cut-out 219 is aligned with the contact 207b which opens the circuit to the motor 75. During the rotation of the valve rotor 135 to the fast-rinse position, the switch 121 has moved its contact 222 to a position wherein it completes a circuit between the conductors 208 and 213 for purposes to be described.

Also, during this rotation of the switch 120, the timer is inoperative since it is shorted out through conductors 203 and 207, and switch 120. As the cut-out portion 219 is aligned with the contact 209b, the timer again commences operation and after a preset period of time elapses for completion of the fast-rinse operation, the switch 201 will be rotated to a position wherein the contact 205 engages the contact 208a. In this position, a circuit is again completed to the motor 75 through the lines 208 and 213, and the motor commences rotation of the rotor to the softening position. This rotation continues until the projection 222 no longer engages the contact 208b and circuit to the motor is again open. Thus the regeneration cycle is completed with the rotor 135 in its softening position once again. It should be appreciated that the switches 120 and 121 have moved with the rotor 135 through 180° and, since each of these components is symmetrical, are in a position to be moved through another regeneration cycle.

It should also be understood that the program timer 29 could be eliminated from the system without departing from the scope of the invention. This would allow the regeneration cycle to be started only by the manually actuated button or switch 195 which could be mounted on the control box 30 near the main tank 10 or spaced remotely therefrom, for instance, in the kitchen of the home in which the system is being utilized.

The electrical control system for the semi-automatic or top-loading water softening system is shown in FIG. 16 and is similar in many respects to the electrical control system shown in FIG. 14, and consequently the components which are identical have been indicated by the same reference characters. This system does not use the program timer 29 but includes another rotary switch 230 driven by the timer 200. In addition, the electrical conductors 235 and 236 together with their contacts 235a and b and 236a and b, respectively, interconnect the switches 201 and 120.

The essential differences in the operation of this system as compared to the fully automatic system are that the former is initiated manually by rotating the switch 201 or by manual switch 195 and the operation thereof is automatically terminated subsequent to the backwash operation so that the cover 11 can be removed from the main tank 10 and salt added thereto. Also, after the salt has been added and the cover replaced, the system is manually actuated by turning the switch 201 to the brine-slow rinse position. The operation of this control system is best explained in connection with the diagram of FIG. 16 and the table shown in FIG. 17. In the softening position the circuitry and switches are arranged as shown in FIG. 16 and the motor 75 has positioned the valve rotor 135 in the softening position and both the motor 75 and the timer 200 are inoperative.

The regeneration cycle of the semi-automatic system can be initiated in either of two ways. That is, it can be initiated by closing switch 195 thereby completing a circuit to the motor 75 through the conductor 195d, switch 195, conductor 235, switch 120, and the conductors 214 and 213. The motor immediately rotates the switch 121 to engage the projection 225 with the contact 208b to complete another circuit to the motor 75 through switch 201, conductor 208, switch 121 and conductor 213 so that the motor continues to run after the normally open switch 195 is released. The movement of the rotor 135 to the backwash position is terminated when the motor has rotated the switch 121 sufficiently so that projection 225 no longer engages the contact 208b thus opening the circuit to the motor 75.

The regeneration cycle can also be initiated by turning the switch 201 in a clockwise direction from the position shown in FIG. 16 to a position wherein the projection 205 engages the contact 235a and a circuit is completed to motor 75 through the conductor 235, switch 120, conductors 214 and 213. The motor 75 then rotates the valve rotor to the backwash position and further rotation thereof is stopped as the cut-out portion 219 aligns with the contact 235b so that the circuit to the motor 75 is again opened.

During the rotation to the backwash position, the circuit to the timer 200 has been completed through conductor 203 and switches 230 and 120 and the timer begins to rotate the switch 201. After a preset time the contact 205 engages the contact 236a so that a circuit is again completed to the motor 75 through the line 236, switch 120 and the conductors 214 and 213.

The motor then rotates the rotor 135 to the off position, as described hereinabove, wherein the hard water inlet port 25c is blocked. When the rotor reaches the off position, the cut-out portion 220 aligns with the contact 236 and the circuit to the motor 75 is opened. Simultaneously with the movement of contact 205 engagement with contact 236a, the timer 200 rotates switch 230 so that its cut-out portion 231 aligns with the contact 203a, and the circuit to the timer 200 is broken and operation of the timer ceases. Thus it should be evident that in the off position, both the timer 200 and motor 75, as well as the flow of pressurized water to the system, are inoperative and this status will remain unchanged until the timer switch 201 is manually rotated.

After the salt is added to the main tank 10 and the cover 11 replaced, the brine-slow rinse cycles are initiated by manually turning the switch 201 so that its projection 205 completes a circuit to the motor 75 through the contact 209a, the switch 120, and the conductors 214 and 213. The motor 75 then moves the rotor 135 to the brine-slow rinse position wherein further immediate operation of the motor 75 is terminated since the cut-out portion 220 is aligned with the contact 209b and the circuit to the motor 75 is opened. In this position of switch 120 the circuit of the timer 200 is no longer short-circuited through the conductor 209, switch 120 and conductor 203 but is completed through conductor 203, switch 120, and the conductors 214 and 213, and thus the timer is operating.

The timer 200 continues to run and, after the time allowed for the brine-slow rinse operation elapses, the contact 205 is brought into engagement with the contact 207a and a circuit completed through conductors 207 and switch 120 to energize the motor 75 and move the valve rotor 135 to the fast-rinse position. During the short time that the valve rotor is being moved to the fast-rinse position, the timer 200 is short-circuited through conductors 207 and 203 and switch 120. When the rotor 135 reaches this fast-rinse position, the cut-out portion 220 is aligned with the contact 207b, the circuit to motor 75 is opened and the timer circuit is reactivated.

During the fast-rinse operation the timer 200 continues to run, and after the preset time has elapsed for completion of the fast-rinse operation, the contact 205 of the switch 201 is brought into engagement with the contact 208a thereby completing a circuit to the motor 75 and causing movement of the valve rotor 135 to the softening position. This circuit is maintained so long as the contact 222 of switch 121 is in engagement with the contact 208b and then the circuit to the motor 75 is open. When the motor 75 has positioned the valve rotor 135 in the softening position, the switches 120 and 121 have reached the positions shown in FIG. 16 wherein the circuit to the motor 75 and to the timer 200 are open and this control system has been returned to its starting position and is positioned to commence another regeneration cycle in the same manner as just described.

It should be appreciated that in both the electrical control systems, as shown in FIGS. 14 and 16, the timer 200 is short-circuited during the periods in which the motor 75 is energized. This arrangement serves the important purposes of permitting the backwash, brine-slow sinse and fast-rinse operations to be effective for precisely the time set on the timer 200 without subtraction therefrom of the time required for positioning the rotor 135. In addition, this arrangement permits use of very simple circuitry since the timer 200 can be connected in series with the motor 75. If the timer 200 was not short-circuited during energization of the motor 75, it would be difficult, if not impossible, to start this motor due to the high resistance of the timer motor which greatly limits the current flow to the motor 75. This high resistance is due to the fact that the timer motor is quite small as compared to the motor 75. On the other hand, the timer 200 operates without difficulty even though it is connected in series wtih the motor 75 since the resistance of the latter is quite low and consequently the voltage drop thereacross will not materially affect operation of the timer 200.

Another embodiment of the invention is shown in FIG. 13 wherein a manual system is provided for rotating the valve rotor 135 to any of the positions shown in FIGS. 8 through 12. This system includes a handle 240 which is rigidly secured to the hub member 242 mounted on the rotor shaft 100a for the purpose of rotating the valve rotor 135. A pointer 244 is provided on the member 242 and cooperates with the plate 245 secured by bolts 247 to the housing 68 for the purpose of giving the operator a visual indication of the valve rotor position. In addition, it may be desirable to provide appropriate directions on this plate 245 for instructing the operator in the procedures for effecting regeneration of the associated water softening system.

From the foregoing it is seen that applicant has provided a water softening system which is completely operated by actuating a single control valve which has essentially only one moving part, and consequently the entire system operates over extended periods with increased efficiency and reliability. The symmetrical arrangement of the channels in the valve rotor permits a regeneration cycle to be effected by only a 180° movement of the rotor with the rotor ending each cycle in a position for starting another cycle. In addition, the system is provided with a brine valve for automatically supplying a predetermined volume of brine which is supplied to the main tank during the regeneration cycle. The softening system is easily modified to a fully automatic, a semi-automatic or top-loading, or a manually actuated unit, thereby reducing the ultimate cost to the public, since most of the components of the system can be mass produced in much larger numbers. In addition, the fully automatic and the semi-automatic softening systems are provided with electrical control systems in a series mounted motor and timer which coact to position the control valve appropriately and automatically during the regeneration cycles.

While the forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. A valve assembly of the character described, comprising a valve body having a plurality of independent chambers formed therein, said valve body having thereon a flat valve plate with a plurality of ports formed therein having their centers disposed on a circle, each of said ports communicating with at least one of said chambers, a valve rotor mounted in sealing contact with said valve plate for rotation about an axis which extends through the center of said circle and is perpendicular to the surface of said valve plate, at least one channel formed in said rotor having a center line disposed on a radius substantially equal to the radius of said circle, said channels cooperating with said valve plate to define passages for interconnecting and disconnecting various combinations of said ports as said valve rotor is rotated about said axis, a low resistance valve motor for rotating said rotor about said axis, timer means including a high resistance time motor having a switch driven thereby for automaticaly completing a circuit to said valve motor to move said valve rotor to each of a plurality of positions, said timer motor being mounted electrically in series with said valve motor, and second switch means directly responsive to the position of said rotor for short circuiting said timer motor during energization of said valve motor and for opening said circuit to said valve motor when said rotor reaches each of said positions.

2. A valve assembly of the character set forth in claim 1 wherein said valve rotor has a pair of arcuate channels disposed symmetrically therein for cooperation with said ports in said valve plate to sequentially connect and disconnect various combinations of said ports each time said rotor is moved with respect to said ports through 180°, and means defining a pressure chamber on the side of said valve rotor opposite said channels for receiving pressurized fluid to urge said valve rotor toward said valve plate for fluid tight sealing therebetween.

3. A valve assembly for a water softening system comprising, a valve body, said valve body having thereon a flat valve plate with a plurality of separate ports including an inlet port adapted for connection to a source of hard water, a top port adapted to be connected to the top of a resin tank, a bottom port adapted to be connected to the bottom of the resin tank, an outlet port adapted to be connected to a soft water utilization system, a drain port adapted to be connected to a drain, a brine port adapted to be connected to a source of brine, all of said ports having their centers disposed on a common circle, a valve rotor mounted in sealing contact with said valve plate for rotation about an axis which extends through the center of said circle and is perpendicular to the surface of said valve plate, a pair of symmetrically disposed arcuate channels in said rotor having a center line disposed on a radius substantially equal to the radius of said circle, said rotor including means to move said rotor with respect to said plate so that said channels cooperate with said valve plate and said ports to complete a regeneration cycle each time said rotor is rotated 180°, each said cycle including a softening position wherein said inlet port is connected to said top port and said outlet port is connected to said bottom port, a backwash position wherein said inlet port is connected to said bottom port and said top port to said drain port, a brine-slow rinse position wherein said inlet port is connected to said top port and to said outlet port and said bottom port to said drain port, and a fast rinse position wherein said inlet port is connected to said drain port, pump means actuated when said valve rotor is in said brine-slow rinse position for forcing a predetermined amount of brine from the brine tank into the top of the resin tank, an automatic control system for effecting rotation and positioning of said rotor in each of positions including a motor rotatably connected to said rotor, said motor having a plurality of circuits connected thereto each being correlated with one of said distinct positions, timer means for sequentially connecting each of said circuits to a source of power to effect operation of said motor, and switch means in each of said circuits actuated by said rotor for opening each circuit when it is connected to said source and when said rotor reaches the position associated with the connected circuit.

4. A valve assembly for a water softening system comprising, a valve body, said valve body having thereon a flat polytetrafluoroethylene valve plate, a resilient back-up member between said valve body and said valve plate, said valve plate having a plurality of separate ports including an inlet port adapted for connection to a source of hard water, a top port adapted to be connected to the top of a resin tank, a bottom port adapted to be connected to the bottom of the resin tank, an outlet port adapted to be connected to a soft water utilization system, a drain port adapted to be connected to a drain, a brine port adapted to be connected to a source of brine, all of said ports having their centers disposed on a common circle, a valve rotor mounted in sealing contact with said valve plate for rotation about an axis which extends through the center of said circle and is perpendicular to the surface of said valve plate, a pair of symmetrically disposed arcuate channels in said rotor having a center line disposed on a radius substantially equal to the radius of said circle, said rotor including means to move said rotor with respect to said plate so that said channels cooperate with said valve plate and said ports to complete a regeneration cycle each time said rotor is rotated 180°, each said cycle including a softening position wherein said inlet port is connected to said top port and said outlet port is connected to said bottom port, a backwash position wherein said inlet port is connected to said bottom port and said top port to said drain port, a brine-slow rinse position wherein said inlet port is connected to said top port and to said outlet port and said bottom port to said drain port, and a fast rinse position wherein said inlet port is connected to said drain port, and pump means actuated when said valve rotor is in said brine-slow rinse position for forcing a predetermined amount of brine from the brine tank into the top of the resin tank.

5. A valve assembly for a water softening system comprising, a valve body, said valve body having thereon a flat polytetrafluoroethylene valve plate with a plurality of separate ports including an inlet port adapted for connection to a source of hard water, a top port adapted to be connected to the top of a resin tank, a bottom port adapted to be connected to the bottom of the resin tank, an outlet port adapted to be connected to a soft water utilization system, a drain port adapted to be connected to a drain, a brine port adapted to be connected to a source of brine, all of said ports having their centers disposed on a common circle, a valve rotor mounted in sealing contact with said valve plate for rotation about an axis which extends through the center of said circle and is perpendicular to the surface of said valve plate, a pair of symmetrically disposed arcuate channels in said rotor having a center line disposed on a radius substantially equal to the radius of said circle, said rotor including means to move said rotor with respect to said plate so that said channels cooperate with said valve plate and said ports to complete a regeneration cycle each time said rotor is rotated 180°, each said cycle including a softening position wherein said inlet port is connected to said top port and said outlet port is conected to said bottom port, a backwash position wherein said inlet port is connected to said bottom port and said top port to said drain port, a brine-slow rinse position wherein said inlet port is connected to said top port and to said outlet port and said bottom port to said drain port, and a fast rinse position wherein said inlet port is connected to said drain port, an automatic control system for effecting rotation and positioning of said rotor in each of said positions including a motor rotatably connected to said rotor, said motor having a plurality of circuits connected thereto each being correlated with one of said distinct positions, timer means for sequentially connecting each of said circuits to a source of power to effect operation of said motor, and switch means in each of said circuits actuated by said rotor for opening each circuit when it is connected to said source and when said rotor reaches the position associated with the connected circuit.

References Cited by the Examiner

UNITED STATES PATENTS

| | | | |
|---|---|---|---|
| 1,173,026 | 1/1930 | Daniels | 210—278 X |
| 1,860,927 | 5/1932 | Eisenhauer | 210—126 X |
| 1,914,333 | 6/1933 | Staegemann | 210—141 X |
| 1,937,324 | 11/1933 | Pick | 210—140 |

(Other references on following page)

UNITED STATES PATENTS

| | | | |
|---|---|---|---|
| 2,071,997 | 2/1937 | Bard | 210—126 X |
| 2,098,131 | 11/1937 | Bluhm | 137—430 |
| 2,254,421 | 9/1941 | Eickmeyer et al. | 137—599.1 X |
| 2,507,343 | 5/1950 | Lindsay et al. | 210—278 X |
| 2,581,878 | 1/1952 | Pick | 137—625.46 |
| 2,598,362 | 5/1952 | Daniels | 137—599.1 |
| 2,833,309 | 5/1958 | Bird | 137—625.46 |
| 2,886,056 | 5/1959 | Ratliff | 137—430 |
| 2,962,041 | 11/1960 | Johnson | 137—559.1 |
| 2,974,681 | 3/1961 | Whitehurst | 251—368 X |
| 3,028,964 | 4/1962 | Reynolds | 210—140 |
| 3,073,674 | 1/1963 | Rudelick | 210—140 X |

REUBEN FRIEDMAN, *Primary Examiner.*

HERBERT L. MARTIN, *Examiner.*